March 6, 1956  C. T. SAMPSON, SR  2,736,980
FISHING DEVICE
Filed June 29, 1953

Charles T. Sampson, Sr.
INVENTOR.

BY *Thomas A. O'Brien*
*and Harvey B. Jackson*
Attorneys

United States Patent Office 2,736,980
Patented Mar. 6, 1956

2,736,980

FISHING DEVICE

Charles T. Sampson, Sr., Wilberforce, Ohio

Application June 29, 1953, Serial No. 364,833

1 Claim. (Cl. 43—41)

This invention relates to new and useful improvements and structural refinements in fishing devices, and the principal object of the invention is to provide a fishing device of the character herein described, which may be conveniently attached to a fishing line in such manner as to afford a substantial amount of protection for live bait carried by the device, that is, so as to protect the bait from being mutilated or swallowed by the fish.

The above object is achieved by the provision of a fishing device which is in the nature of an elongated frame carrying a plurality of fish hooks and equipped with means for mounting and protectively enclosing the bait.

Some of the advantages of the invention reside in its simplicity of construction, in its efficient and dependable operation and in its adaptability to economical manufacture.

With the above more important object and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
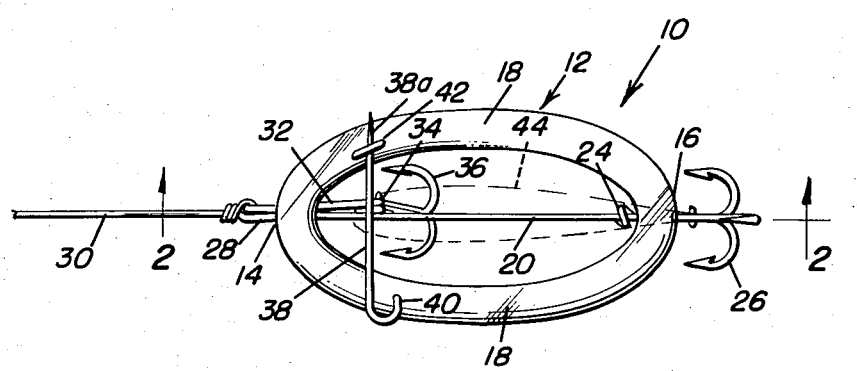
Figure 1 is a top plan view of the invention.
Figure 2:
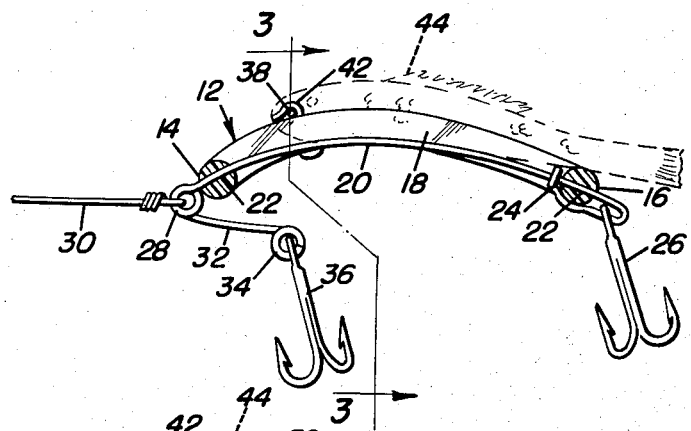
Figure 2 is a vertical sectional view, taken substantially in the plane of the line 2—2 of Figure 1.
Figure 3:
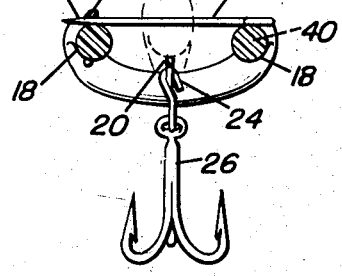
Figure 3 is a transverse sectional view, taken substantially in the plane of the line 3—3 of Figure 2.

Referring now to the accompanying drawings in detail, the fishing device is designated generally by the reference character 10 and embodies in its construction an elongated oval frame 12, having a front end 14, a rear end 16 and including a pair of transversely spaced side members 18, as shown.

The frame 12 is preferably longitudinally arcuated and an arcuate rod 20 extends longitudinally of the frame, having the front and rear end portions thereof anchored in suitable bores 22 with which the front and rear ends 14 and 16 of the frame are provided.

The rear end portion of the rod 20 has a reverse bend and its extremity secured to an adjacent portion of the rod as indicated as at 24 to provide a loop and has connected thereto a suitable fish hook 26, while the front end portion of the rod 20 is coiled to provide an eye 28 whereby the entire device may be conveniently attached to a fishing line 30. After forming the eye 28, the front end portion of the rod 20 is extended downwardly and rearwardly in a reverse bend, as indicated at 32, and terminates in a loop 34 to which is attached a second fish hook 36.

The device is provided with means for supporting live bait thereon, said means comprising a resilient prong or pin 38 which has one end portion thereof anchored as by welding on one of the side members 18, as indicated at 40, the prong 38 extending transversely of the frame 12, adjacent the front end 14 and having a free end portion 38A which is releasably engageable with a catch 42 secured to the other side member 18.

When the device is placed in use, the prong 38 is passed through the head portion of a minnow 44, or some other live bait, and the free end portion 38A of the prong 38, is engaged with the catch 42, so that the minnow 44 is anchored in position between the side members 18 of the frame 12 and is effectively protected thereby. The arcuate rod 20 assists in supporting the bait 44 in the frame. The entire frame 12 is preferably formed from transparent material so that it is virtually invisible while in use, and of course, the device may be used with bait of various types, not necessarily minnows.

While in the foregoing there has been shown and described the preferred embodiment of this invention, it is to be understood that minor changes in the details of construction, combination and arrangement of parts may be resorted to without departing from the spirit and scope of the invention as claimed.

What is claimed as new is as follows:

A fishing device of the character described comprising: a substantially oval, longitudinally arcuate transparent frame, a catch on one side of said frame, a transverse, resilient pin on the other side of the frame for impaling and anchoring a bait therein and engageable in the catch, a curved rod traversing the frame longitudinally and passing through the ends thereof, said rod passing beneath the pin in spaced relation thereto and assisting in supporting the bait in the frame, said rod having a reverse bend in its rear end portion and the extremity thereof secured to an adjacent portion of the rod to provide a first loop, a hook mounted in said first loop, said rod further including a substantially reverse bend in its forward end portion extending beneath the frame and terminating in a second loop, and a hook mounted in the second loop, said rod still further including an eye formed at the bend in said forward end portion for connecting a line to the device.

References Cited in the file of this patent

UNITED STATES PATENTS

| | | |
|---|---|---|
| 323,111 | Chapman | July 28, 1885 |
| 1,584,100 | Koepke | May 11, 1926 |
| 1,759,639 | Belloch | May 20, 1930 |
| 2,051,651 | Pachner et al. | Aug. 18, 1936 |
| 2,112,532 | Jones | Mar. 29, 1938 |
| 2,238,900 | Hadaway | Apr. 22, 1941 |
| 2,346,949 | Sindler | Apr. 18, 1944 |
| 2,490,248 | Barthel | Dec. 6, 1949 |
| 2,618,097 | Johnstone | Nov. 18, 1952 |

FOREIGN PATENTS

| | | |
|---|---|---|
| 160,519 | Great Britain | Mar. 17, 1921 |